United States Patent
Tsai et al.

(10) Patent No.: US 8,203,854 B2
(45) Date of Patent: Jun. 19, 2012

(54) DISPLAY SUSPENDING FRAME DEVICE, AND ASSEMBLY OF THE DISPLAY SUSPENDING FRAME DEVICE, A DISPLAY, AND AN ELECTRONIC DEVICE

(75) Inventors: Wen-Hsi Tsai, Hsichih (TW);
Chih-Hsiung Chen, Hsichih (TW);
Shuang-Ji Jiang, Hsichih (TW);
Yao-Wen Hsu, Hsichih (TW);
Hong-Chang Liu, Hsichih (JP)

(73) Assignee: Aopen Inc., Hsichih (TW)

( * ) Notice: Subject to any disclaimer, the term of this patent is extended or adjusted under 35 U.S.C. 154(b) by 426 days.

(21) Appl. No.: 12/457,961

(22) Filed: Jun. 26, 2009

(65) Prior Publication Data
US 2010/0033943 A1    Feb. 11, 2010

(30) Foreign Application Priority Data

Aug. 7, 2008   (TW) ............................... 97214167 U

(51) Int. Cl.
*H02B 1/01*   (2006.01)
(52) U.S. Cl. ....................................... 361/829; 248/327
(58) Field of Classification Search ................. 361/829
See application file for complete search history.

(56) References Cited

U.S. PATENT DOCUMENTS

| | | | | |
|---|---|---|---|---|
| 4,343,525 A * | 8/1982 | Knickerbocker | ............ | 439/371 |
| 5,921,402 A * | 7/1999 | Magenheimer | ................ | 211/26 |
| 6,046,558 A * | 4/2000 | Larson et al. | ................ | 318/283 |
| 6,206,318 B1 * | 3/2001 | Glass | ......................... | 242/400.1 |
| 7,316,379 B1 * | 1/2008 | Graham | ..................... | 248/298.1 |
| 7,334,766 B2 * | 2/2008 | Ligertwood | ............ | 248/292.13 |
| D566,444 S * | 4/2008 | Grey | ............................... | D6/553 |
| 7,441,739 B2 * | 10/2008 | Huang | ..................... | 248/292.14 |
| 7,510,156 B1 * | 3/2009 | Yaeger | ....................... | 248/284.1 |
| 7,637,465 B2 * | 12/2009 | Huang | ..................... | 248/222.13 |
| 7,661,642 B2 * | 2/2010 | Oh et al. | ..................... | 248/274.1 |
| 7,673,837 B2 * | 3/2010 | Park | .............................. | 248/201 |
| 7,891,622 B1 * | 2/2011 | O'Keene | .................. | 248/292.13 |
| 7,963,489 B2 * | 6/2011 | O'Keene et al. | ............. | 248/201 |
| 2003/0201372 A1 * | 10/2003 | Dozier | ....................... | 248/286.1 |
| 2007/0258196 A1 * | 11/2007 | Koskinen et al. | ............. | 361/681 |
| 2007/0262215 A1 * | 11/2007 | Tan | ................................ | 248/201 |
| 2008/0156949 A1 * | 7/2008 | Sculler et al. | ............ | 248/220.21 |
| 2010/0044536 A1 * | 2/2010 | Huang | ............................ | 248/201 |
| 2010/0309615 A1 * | 12/2010 | Grey et al. | ................ | 361/679.01 |

FOREIGN PATENT DOCUMENTS

JP        2009060955 A  *  3/2009

* cited by examiner

*Primary Examiner* — Timothy Thompson
*Assistant Examiner* — Nathan Milakovich
(74) *Attorney, Agent, or Firm* — Davidson Berquist Jackson & Gowdey, LLP

(57) ABSTRACT

A display suspending frame device includes a suspending seat and at least one suspending frame. The suspending seat includes an upright mounting plate, a rear slide rail set disposed forwardly of the mounting plate and connected to the mounting plate, and a front slide rail set disposed forwardly of the rear slide rail set and connected to the rear slide rail set. The at least one suspending frame is for mounting to a rear face of a display and is mounted slidably on the front slide rail set. By arranging the rear slide rail set between the mounting plate of the suspending seat and the front slide rail set, a space is provided for accommodating an electronic device.

18 Claims, 9 Drawing Sheets

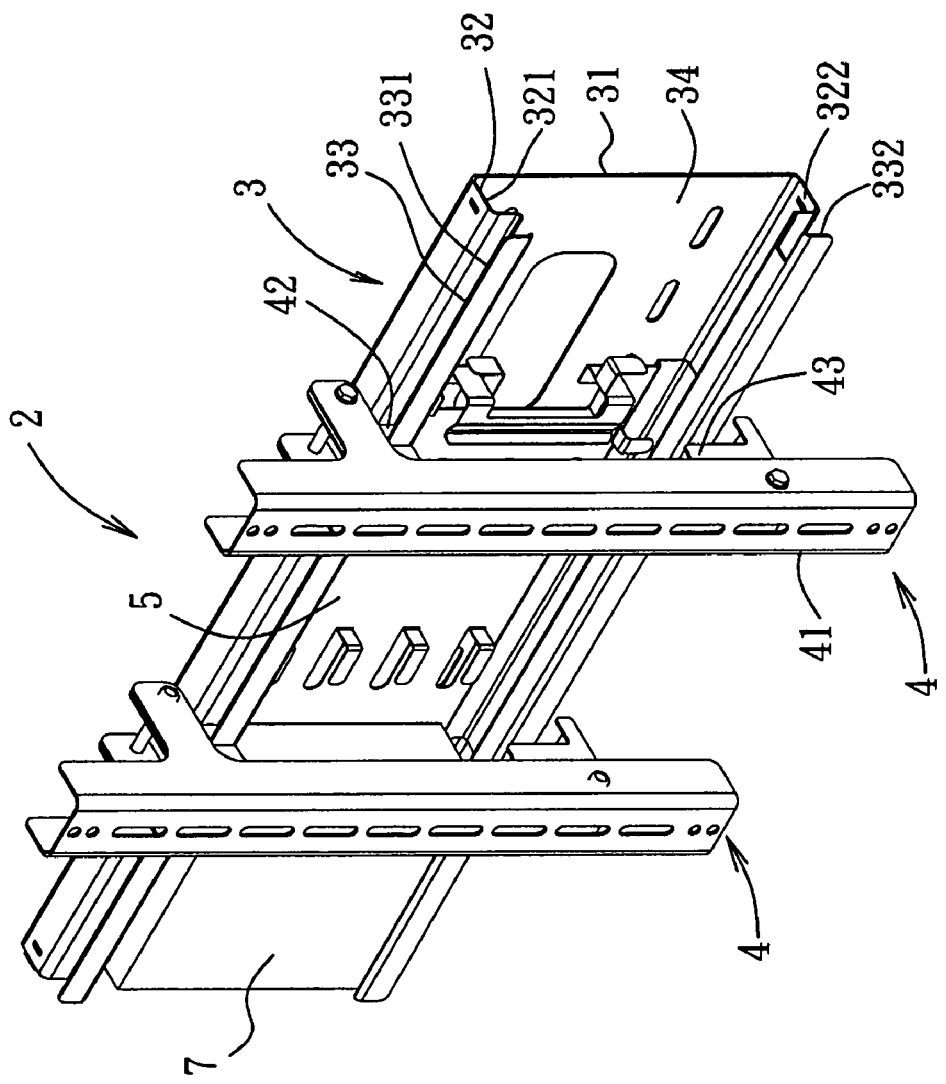
F I G. 6

DISPLAY SUSPENDING FRAME DEVICE, AND ASSEMBLY OF THE DISPLAY SUSPENDING FRAME DEVICE, A DISPLAY, AND AN ELECTRONIC DEVICE

CROSS-REFERENCE TO RELATED APPLICATION

This application claims priority of Taiwanese Application No. 097214167, filed on Aug. 7, 2008.

BACKGROUND OF THE INVENTION

1. Field of the Invention

The invention relates to a display suspending frame device, more particularly to a display suspending frame device having two slide rail sets.

2. Description of the Related Art

With the increasing popularity of thin type displays, thin type displays can be seen in use in more and more places. There are generally two ways of installing a thin type display. One is to place the display on a platform (e.g., a television cabinet). The other is to suspend the display from an upright wall surface.

Since suspension is better than placement on a platform in terms of space economy, currently, it is more common for thin type displays to be suspended. For the purpose of suspending a thin type display, a suspending frame is generally used.

Referring to FIG. 1, Taiwanese utility model no. M291487 discloses a suspending frame 1, which includes a suspending seat 11 and two suspending members 12 suspended on the suspending seat 11. The suspending seat 11 is mounted onto a wall surface, and includes an upper suspending plate 111 and a lower suspending plate 112. A display (not shown) is mounted onto the suspending members 12. Each of the suspending members 12 includes an upper suspending hook 121 engaging the upper suspending plate 111, and a lower suspending hook 122 engaging the lower suspending plate 112. By virtue of the arrangement of the upper and lower suspending hooks 121, 122 and the upper and lower suspending plates 111, 112, the object of suspending the display can be achieved.

However, the thin type display is often used in conjunction with an electronic device, such as a power supply, a control box, or a player. The design of the aforesaid suspending frame 1 does not take into consideration the need for space to accommodate such electronic device.

Therefore, these accessorial electronic devices are generally directly secured to a rear face of the display by screws, which is inconvenient, or are installed at positions close to the display using additional mounting frames, which is unsightly in terms of appearance.

In order to avoid the above drawbacks, the present invention contemplates to improve conventional mounting frames by using two sets of slide rails.

SUMMARY OF THE INVENTION

Therefore, an object of the present invention is to provide a display suspending frame device having a space for accommodating an electronic device.

Another object of the present invention is to provide an assembly of a display suspending frame device having a space for accommodating an electronic device, a display, and the electronic device.

Accordingly, the display suspending frame device of the present invention includes a suspending seat and at least one suspending frame. The suspending seat includes an upright mounting plate, a rear slide rail set disposed forwardly of the mounting plate and connected to the mounting plate, and a front slide rail set disposed forwardly of the rear slide rail set and connected to the rear slide rail set. The at least one suspending frame is for mounting to a rear face of a display and is mounted slidably on the front slide rail set.

Preferably, the rear slide rail set includes an upper rear slide rail and a lower rear slide rail which have openings opposite to each other and which are connected respectively to upper and lower edges of the mounting plate. The mounting plate, the upper rear slide rail, and the lower rear slide rail cooperatively define a receiving space.

Preferably, the display suspending frame device further includes at least one slide frame. The slide frame has upper and lower faces respectively abutting against the upper and lower rear slide rails such that the slide frame is mounted slidably in the receiving space.

In an embodiment of this invention, the slide frame includes an upper sliding portion with a lower face, and a lower sliding portion with an upper face. The lower face of the upper sliding portion and the upper face of the lower sliding portion are adapted to be secured respectively to upper and lower sides of an electronic device. The upper and lower sliding portions respectively abut against the upper and lower rear slide rails.

In another embodiment of this invention, the slide frame includes an upper sliding portion, a lower sliding portion, and an upright base plate. The base plate has upper and lower edges that are connected respectively to the upper and lower sliding portions. The upper and lower sliding portions respectively abut against the upper and lower rear slide rails. The base plate is formed with two support portions adapted to be secured to upper and lower sides of an electronic device. Alternatively, the base plate is formed with a plurality of retaining hooks adapted for organizing a cable.

Preferably, the display suspending frame device further includes two side covers. The side covers are mounted respectively to left and right sides of the rear slide rail set of the suspending seat.

Preferably, the front slide rail set has an upper front slide rail connected to the upper rear slide rail, and a lower front slide rail connected to the lower rear slide rail. The display suspending frame device includes two of the suspending frames. Each of the suspending frames includes a support portion that is adapted for mounting of the rear face of the display thereto, and an upper connecting portion and a lower connecting portion that are spaced apart with one above the other and that project from the support portion in a direction opposite to the display. The upper connecting portion is mounted slidably on the upper front slide rail. The lower connecting portion is mounted slidably on the lower front slide rail.

The upper and lower connecting portions and the upper and lower front slide rails may be assembled in two different ways and have two different configurations. In one form, each of the upper and lower front slide rails has a generally L-shaped cross-section, and each of the upper and lower connecting portions of each of the suspending frames has two tabs that project respectively from left and right lateral edges of the support portion of the respective one of the suspending frames and that are in the form of downward hooks. In an alternative form, the upper front slide rail has a generally L-shaped cross-section, and the lower front slide rail has a generally inverted L-shaped cross-section. The upper connecting portion of each of the suspending frames has two tabs projecting respectively from left and right lateral edges of the support portion of the respective one of the suspending frames and in the form of downward hooks. The lower connecting portion of each of the suspending frames has two tabs that project respectively from the left and right lateral edges of the support portion of the respective one of the suspending frames and that abut against a front face of the lower front slide rail.

In the assembly of a display suspending frame device, a display, and an electronic device according to the present invention, the structure of the display suspending frame device is identical to that as described hereinabove and will not be repeated herein. Similarly, the connective relationship between the display suspending frame device and the display and the connective relationship between the display suspending frame device and the electronic device have been disclosed hereinabove, and will not be repeated herein.

The meritorious effect of the present invention resides in that, by means of the arrangement of the rear slide rail set between the mounting plate of the suspending seat and the front slide rail set, a space for accommodating the electronic device is provided to thereby enhance the overall appearance.

BRIEF DESCRIPTION OF THE DRAWINGS

Other features and advantages of the present invention will become apparent in the following detailed description of the preferred embodiments with reference to the accompanying drawings, of which:

FIG. 6 is a perspective view to illustrate the second preferred embodiment of a display suspending frame device according to the present invention;

DETAILED DESCRIPTION OF THE PREFERRED EMBODIMENTS

Figure 1:
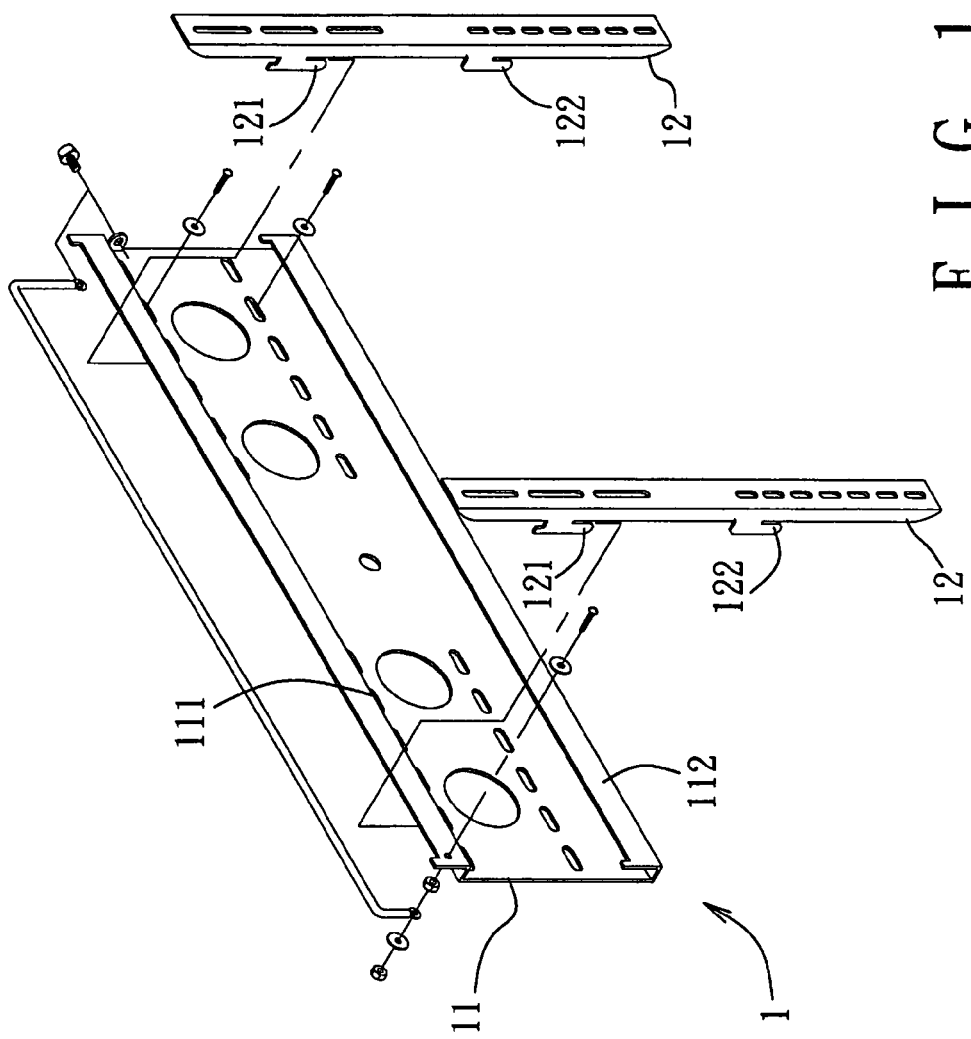
FIG. 1 is an exploded perspective view to illustrate a conventional suspending frame.

Before the present invention is described in greater detail, it should be noted that like elements are denoted by the same reference numerals throughout the disclosure.

Figure 2:
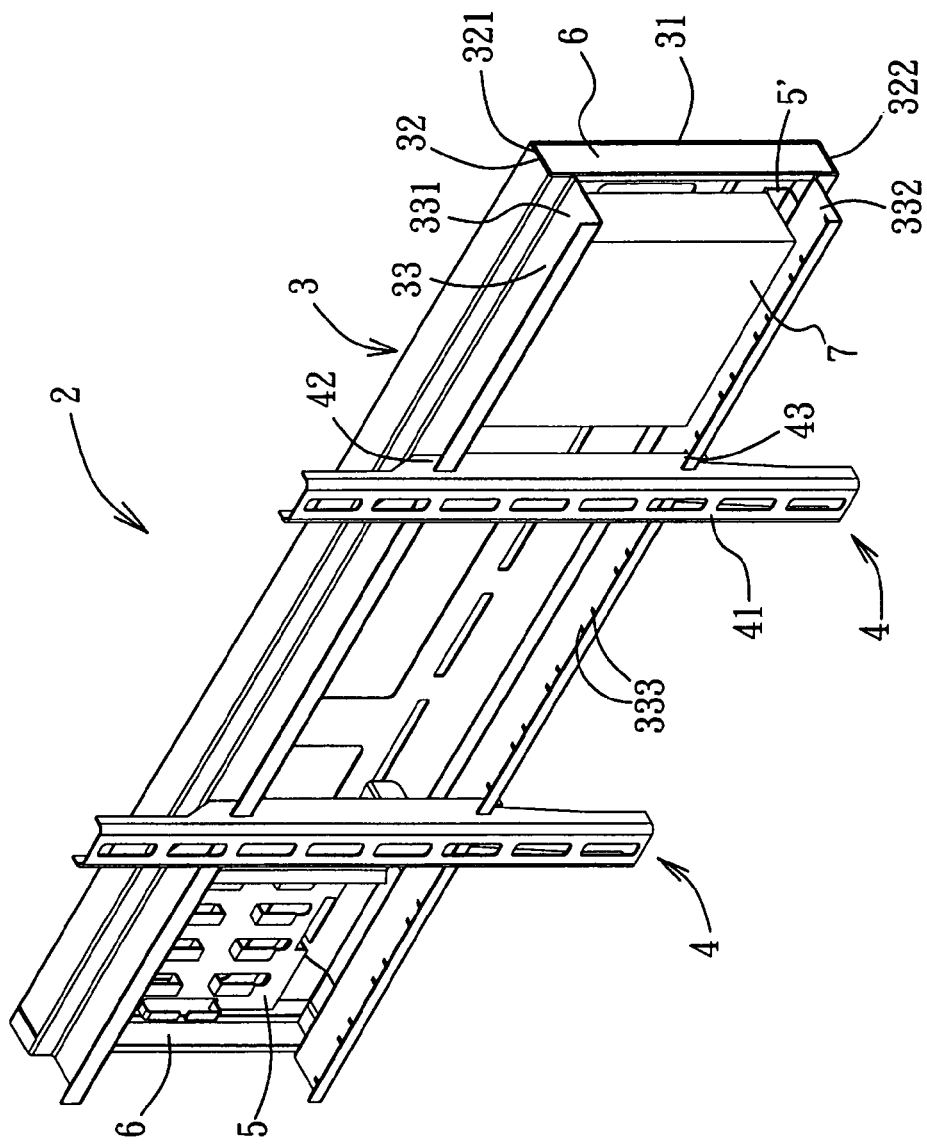
FIG. 2 is a perspective view to illustrate the first preferred embodiment of a display suspending frame device according to the present invention.
Figure 3:
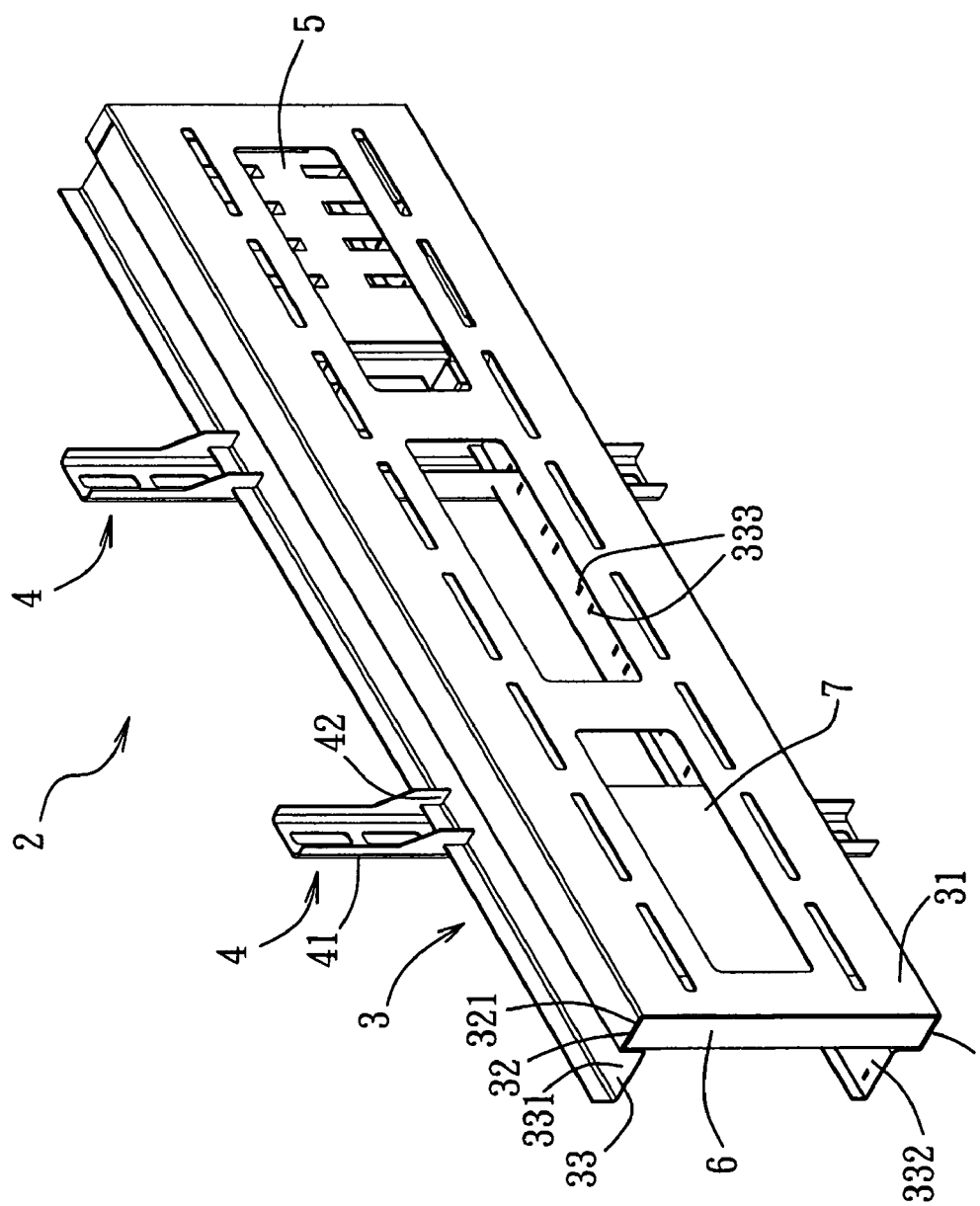
FIG. 3 is another perspective view to illustrate the first preferred embodiment from another angle.
Figure 4:
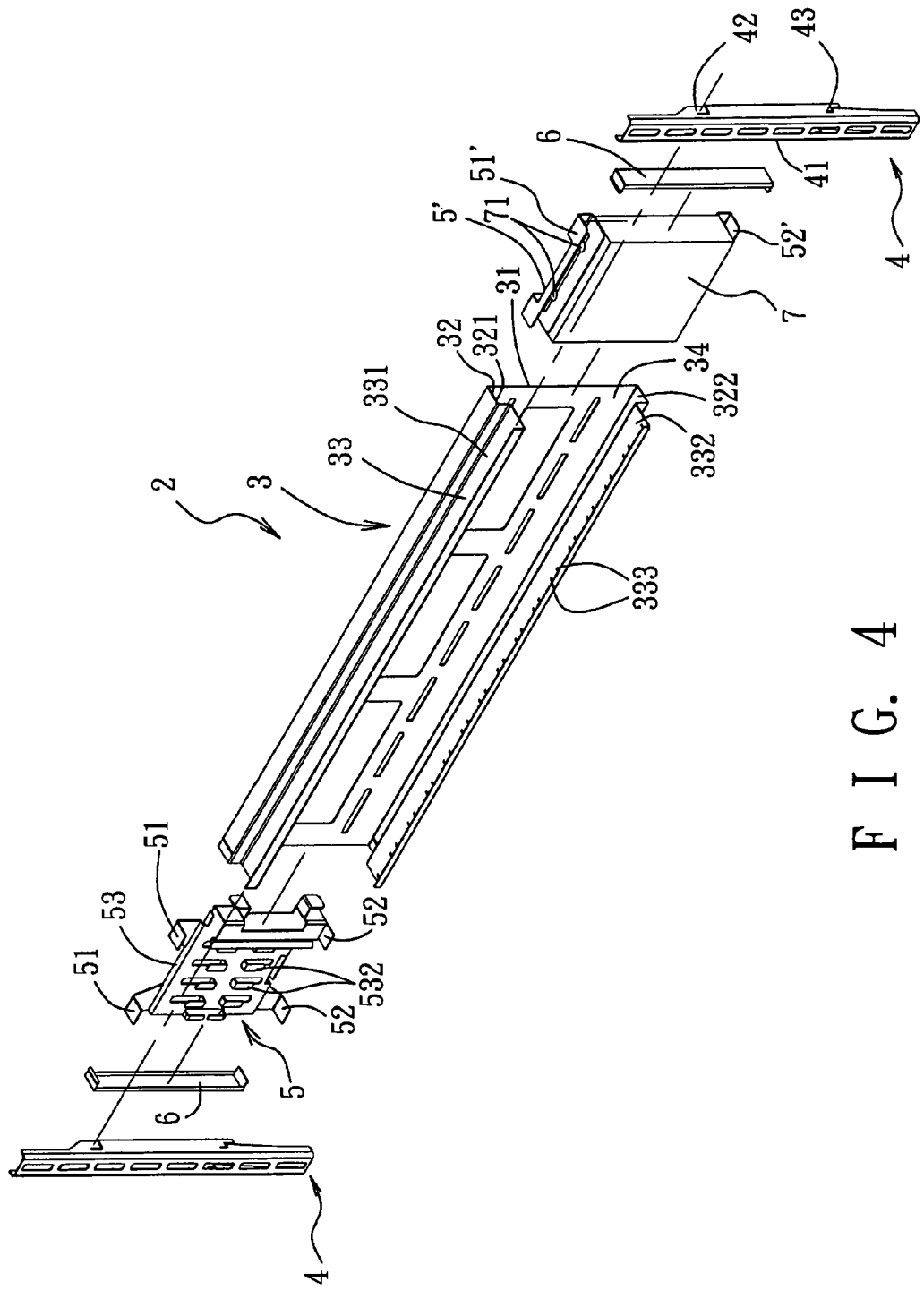
FIG. 4 is an exploded perspective view of the first preferred embodiment.

Referring to FIGS. 2, 3 and 4, the first preferred embodiment of a display suspending frame device 2 according to the present invention is shown to include a suspending seat 3, two suspending frames 4, a slide frame 5, a slide frame 5', and two side covers 6.

The suspending seat 3 includes an upright mounting plate 31, a rear slide rail set 32 disposed forwardly of the mounting plate 31 and connected to the mounting plate 31, and a front slide rail set 33 disposed forwardly of the rear slide rail set 32 and connected to the rear slide rail set 32.

The mounting plate 31 can be secured directly onto a wall (not shown) or fastened to a suspending post (not shown).

The rear slide rail set 32 has an upper rear slide rail 321 and a lower rear slide rail 322 that are connected respectively to upper and lower lateral edges of the mounting plate 31. The upper rear slide rail 321 has a generally inverted U-shaped cross-section (i.e., having a downward opening), whereas the lower rear slide rail 322 has a generally U-shaped cross-section (i.e., having an upward opening).

The front slide rail set 33 has an upper front slide rail 331 connected to the upper rear slide rail 321, and a lower front slide rail 332 connected to the lower rear slide rail 322. The upper front slide rail 331 has a generally L-shaped cross-section (i.e., having an upright portion extending upwardly from a horizontal portion). The lower front slide rail 332 also has a generally L-shaped cross-section (i.e., having an upright portion extending upwardly from a horizontal portion). The horizontal portion of the lower front slide rail 332 is provided with a plurality of engaging slots 333 for positioning the suspending frames 4.

The mounting plate 31, the upper rear slide rail 321, and the lower rear slide rail 322 cooperatively define a receiving space 34 for accommodating the slide frame 5.

In this embodiment, the upper front slide rail 331, the upper rear slide rail 321, the mounting plate 31, the lower rear slide rail 322, and the lower front slide rail 332 are formed integrally from a metal plate that is subjected to a bending process.

Figure 5:
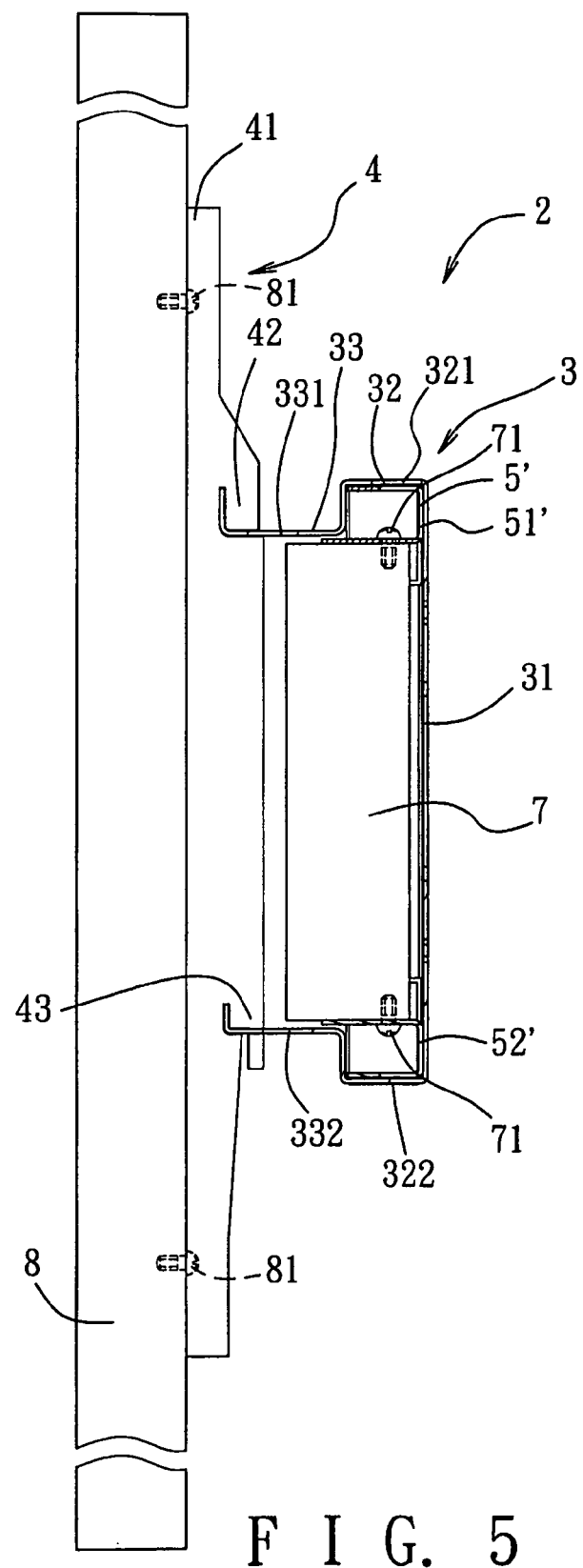
FIG. 5 is a schematic sectional side view of the first preferred embodiment.

Referring to FIGS. 2 and 5, each of the suspending frames 4 has a support portion 41 to which a rear face of a display 8 can be secured, and an upper connecting portion 42 and a lower connecting portion 43 that are spaced apart with one above the other and that project from the support portion 41 in a direction opposite to the display 8. In this embodiment, the rear face of the display 8 is secured to the support portion 41 using screws 81. The upper connecting portion 42 has two tabs projecting respectively from left and right lateral edges of the support portion 41 and in the form of downward hooks. The lower connecting portion 43 likewise has two tabs projecting respectively from left and right lateral edges of the support portion 41 and in the form of downward hooks. Thus, the upper connecting portions 42 of the suspending frames 4 are mounted slidably on the upper front slide rail 331, and the lower connecting portions 43 are mounted slidably on the lower front slide rail 332. Although the suspending frames 4 are exemplified to be two in number in this embodiment, one or more than two suspending frames 4 may be provided in other embodiments of this invention.

It is particularly noted that the lower connecting portion 43 of each of the suspending frames 4 has a lower end retained in a corresponding one of the engaging slots 333 so as to limit displacement of the respective suspending frame 4 along a horizontal direction.

In addition, it is noted that the configurations of the upper and lower front slide rails 331, 332 are not limited to what are disclosed in this embodiment. The upper and lower front slide rails 331, 332 may be configured to have curved cross-sections or any other suitable configurations that permit the upper and lower connecting portions 42, 43 to be mounted slidably and respectively thereon.

Referring again to FIGS. 2 and 4, the slide frames 5, 5' of this embodiment are configured to have different purposes. The slide frame 5 is adapted for organizing a cable, whereas the slide frame 5' is adapted for mounting an electronic device 7.

The slide frame 5 includes a base plate 53, and upper sliding portions 51 and lower sliding portions 52 connected respectively to upper and lower edges of the base plate 53. The base plate 53 is formed with a plurality of retaining hooks 532 adapted for organizing and stowing a cable (not shown). The retaining hooks 532 in this embodiment are arranged in two rows, and the retaining hooks 532 in the same row can have upward and/or downward hooking portions. However, the configuration of the retaining hooks 532 is not limited to that disclosed in this embodiment, and may include any projecting structure around which a cable may be wound or which defines a space for stowage of the cable.

The upper sliding portions 51 include two spaced-apart inverted L-shaped tabs that extend upwardly and respectively from left and right sides of the upper edge of the base plate 53. The lower sliding portions 52 include two spaced-apart L-shaped tabs that extend downwardly and respectively from left and right sides of the lower edge of the base plate 53. The upper and lower sliding portions 51, 52 respectively abut against the upper and lower rear slide rails 321, 322 to enable the slide frame 5 to be mounted slidably in the receiving space 34. It is noted that the configurations of the upper and lower sliding portions 51, 52 are not limited to those disclosed herein, and may include any structure that permits the upper and lower sliding portions 51, 52 to respectively abut against the upper and lower rear slide rails 321, 322 so as to be slidable therealong.

With the configuration of the slide frame 5, peripherals, such as electric cables, signal wires, etc., can be properly organized or stowed on the slide frame 5 to thereby enhance the overall appearance.

The slide frame 5' includes an upper sliding portion 51' and a lower sliding portion 52'. Each of the upper and lower sliding portions 51', 52' resembles a transversely disposed U-shape with a forward opening. The upper and lower sliding portions 51', 52' respectively have lower and upper faces. The electronic device 7 may be secured by fastening upper and lower sides of the electronic device 7 to the upper and lower faces of the upper and lower sliding portions 51', 52', respectively, using screws 71. Moreover, the upper and lower sliding portions 51', 52' respectively have upper and lower faces that respectively abut against the upper and lower rear slide rails 321, 322 to enable the slide frame 5' to be mounted slidably in the receiving space 34.

In this embodiment, by configuring the upper and lower sliding portions 51', 52' to have different specifications or sizes, the electronic device 7, whether it is a power supply, a control box or a player or of a different size, can be secured therebetween so as to be stowable in the receiving space 34. The electronic device 7 can be installed or removed simply by sliding the slide frame 5', together with the electronic device 7, into or out of the rear slide rail set 32 along a direction of extension of the rear slide rail set 32, which is very convenient.

It is particularly noted that, although this preferred embodiment includes one slide frame 5 and one slide frame 5', the number of the slide frames 5, 5' may be varied depending on user requirements, and should not be limited to the number and arrangement disclosed herein. In addition, the slide frames 5, 5' may be dispensed with. In this case, the electronic device 7 together with the cable thereof can still be accommodated in the receiving space 34.

The two side covers 6 are respectively mounted to left and right sides of the rear slide rail set 32 of the suspending seat 3 so that the slide frames 5, 5' cannot be readily removed, thereby providing a basic anti-theft function.

Figure 7:
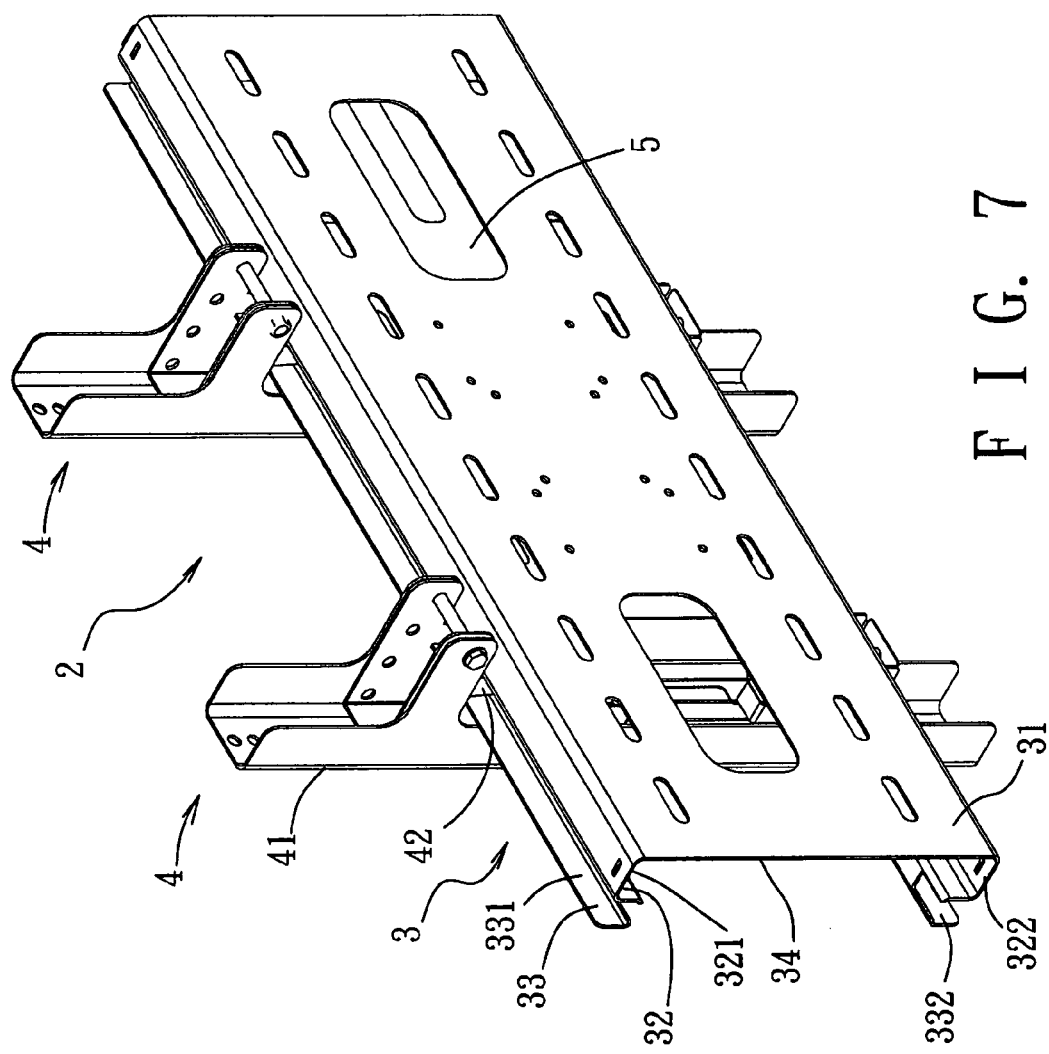
FIG. 7 is another perspective view to illustrate the second preferred embodiment from another angle.
Figure 8:
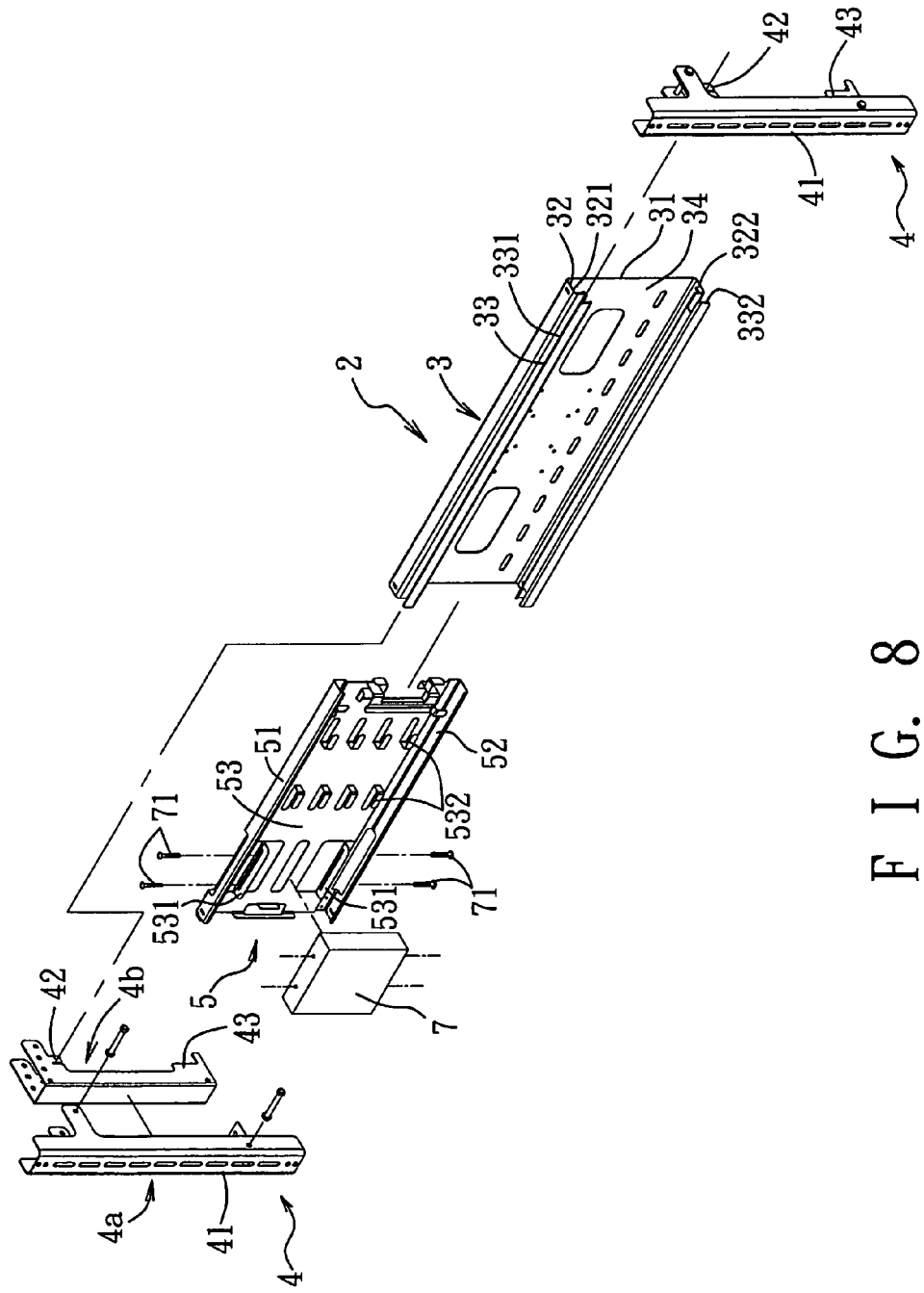
FIG. 8 is an exploded perspective view of the second preferred embodiment.

Referring to FIGS. 6, 7 and 8, the second preferred embodiment of a display suspending frame device 2 according to the present invention is shown to include a suspending seat 3, two suspending frames 4, and a slide frame 5. As the second preferred embodiment is similar to the first preferred embodiment in certain aspects, the following description will be directed only to the differences therebetween.

The first difference between the first and second preferred embodiments resides in the configuration of the lower front slide rail 332 of the front slide rail set 33 of the suspending seat 3. In this embodiment, the lower front slide rail 332 has a generally inverted L-shaped cross-section (i.e., the upright portion extends downwardly from the horizontal portion).

Figure 9:
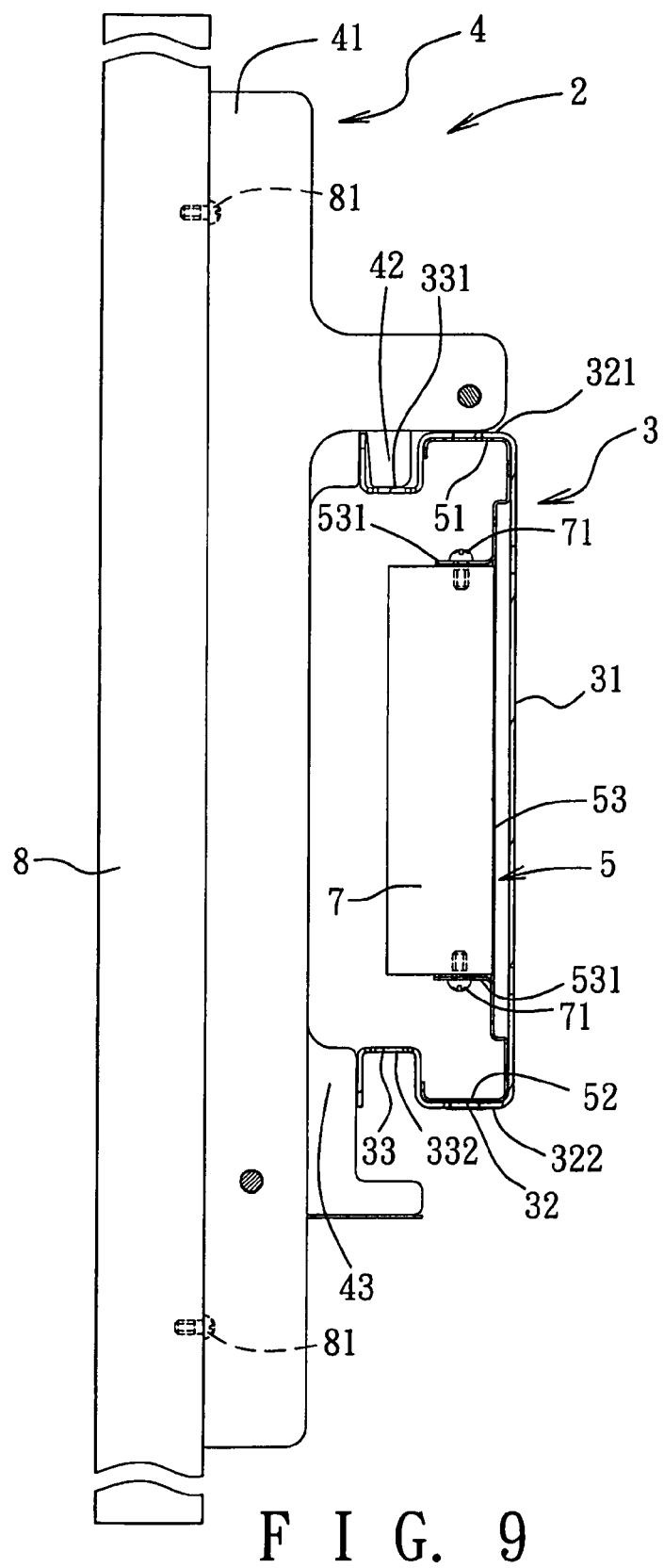
FIG. 9 is a schematic sectional side view of the second preferred embodiment.

Referring to FIGS. 8 and 9, the second difference between the first and second preferred embodiments resides in the configuration of the suspending frames 4. In this embodiment, each of the suspending frames 4 includes a front suspending frame (4a) and a rear suspending frame (4b) which are fastened together by screws, with the support portion 41 provided on the front suspending frame (4a) and the upper and lower connecting portions 42, 43 provided on the rear suspending frame (4b).

Similar to the first preferred embodiment, the upper connecting portions 42 of each of the rear suspending frames (4b) in the second preferred embodiment are tabs in the form of downward hooks. However, the lower connecting portions 43 of each of the rear suspending frames (4b) are tabs abutting against a front face of the lower front slide rail 332. Thus, the upper connecting portions 42 may be mounted slidably on the upper front slide rail 331, with the lower connecting portions 43 abutting against the lower front slide rail 332.

Referring to FIGS. 6 and 8, the third difference between the first and second preferred embodiments resides in the configuration of the slide frame 5. The slide frame 5 in this embodiment is adapted for both cable organizing and mounting of the electronic device 7. The portion of the slide frame 5 for mounting the electronic device 7 is at a left side of the slide frame 5 (see FIG. 8), and the portion of the slide frame 5 for organizing a cable (not shown) is at a right side of the slide frame 5 (see FIG. 8).

The slide frame 5 includes a base plate 53, and upper and lower sliding portions 51, 52 connected respectively to upper and lower edges of the base plate 53.

The upper sliding portion 51 is a generally inverted L-shaped plate that extends upwardly from the upper edge of the base plate 53. The lower sliding portion 52 is a generally L-shaped plate that extends downwardly from the lower edge of the base plate 53. The upper and lower sliding portions 51, 52 respectively abut against the upper and lower rear slide rails 321, 322 to enable the slide frame 5 to be mounted slidably in the receiving space 34.

The base plate 53 is formed with two support portions 531 that are substantially perpendicular to the base plate 53, and a plurality of retaining hooks 532. The electronic device 7 has upper and lower sides that are secured respectively to the support portions 531 using screws 71 so as to be mounted on the slide frame 5. The retaining hooks 532 are arranged in two columns, with those on the left being leftward hooks and those on the right being rightward hooks, for organizing a cable (not shown).

In this embodiment, the slide rail 5 can be configured to have the support portions 531 provided at different positions so that, whether the electronic device 7 is a power supply, a control box, or a player or has a different size, the electronic device 7 can be mounted on the slide frame 5.

The user can, after mounting the electronic device 7 properly on the slide frame 5 and putting the cable neatly in place, slide the slide frame 5 together with the electronic device 7 and the cable into the receiving space 34 along the rear slide rail set 32, thereby enhancing the overall appearance. Conversely, the slide frame 5 can be slid out along the rear slide rail set 32 for removal of the electronic device 7 and the cable, which is very convenient.

It is particularly noted that, although this preferred embodiment includes only one slide frame 5, the number of the slide frame 5 can be increased depending on user requirement, e.g., more than two slide frames 5, and the present invention should not be limited thereto. In addition, the slide frame 5 can be dispensed with, and the electronic device 7 and the cable thereof are directly stowed in the receiving space 34.

In summary, by arranging the rear slide rail set 32 between the front slide rail set 33 and the mounting plate 31 of the suspending seat 3, a space is provided to accommodate the electronic device 7, thereby enhancing the overall appearance.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A display suspending frame device comprising:
   a suspending seat including an upright mounting plate, a rear slide rail set disposed forwardly of said mounting plate and connected to said mounting plate, and a front slide rail set disposed forwardly of said rear slide rail set and connected to said rear slide rail set, said rear slide rail set including an upper rear slide rail and a lower rear slide rail which have openings opposite to each other and which are connected respectively to upper and lower edges of said mounting plate, said mounting plate, said upper rear slide rail, and said lower rear slide rail cooperatively defining a receiving space;
   at least one suspending frame adapted for mounting to a rear face of a display and mounted slidably on said front slide rail set; and
   at least one slide frame adapted for mounting of an electronic device thereon, said slide frame having upper and lower faces respectively abutting against said upper and lower rear slide rails such that said slide frame is mounted slidably in said receiving space along said upper and lower rear slide rails.

2. The display suspending frame device according to claim 1, wherein said slide frame includes an upper sliding portion with a lower face, and a lower sliding portion with an upper face, said lower face of said upper sliding portion and said upper face of said lower sliding portion being adapted to be secured respectively to upper and lower sides of an electronic device, said upper and lower sliding portions respectively abutting against said upper and lower rear slide rails.

3. The display suspending frame device according to claim 1, wherein said slide frame includes an upper sliding portion, a lower sliding portion, and an upright base plate, said base plate having upper and lower edges that are connected respectively to said upper and lower sliding portions, said upper and lower sliding portions respectively abutting against said upper and lower rear slide rails.

4. The display suspending frame device according to claim 3, wherein said base plate is formed with two support portions adapted to be secured to upper and lower sides of an electronic device.

5. The display suspending frame device according to claim 3, wherein said base plate is formed with a plurality of retaining hooks adapted for organizing a cable.

6. The display suspending frame device according to claim 1, further comprising two side covers, said side covers being mounted respectively to left and right sides of said rear slide rail set of said suspending seat.

7. The display suspending frame device according to claim 1, wherein said front slide rail set has an upper front slide rail connected to said upper rear slide rail, and a lower front slide rail connected to said lower rear slide rail, said display suspending frame device comprising two of said suspending frames, each of said suspending frames including a support portion that is adapted for mounting of the rear face of the display thereto, and an upper connecting portion and a lower connecting portion that are spaced apart with one above the other and that project from said support portion in a direction opposite to the display, said upper connecting portion being mounted slidably on said upper front slide rail, said lower connecting portion being mounted slidably on said lower front slide rail.

8. The display suspending frame device according to claim 7, wherein each of said upper and lower front slide rails has a generally L-shaped cross-section, each of said upper and lower connecting portions of each of said suspending frames having two tabs projecting respectively from left and right lateral edges of said support portion of the respective one of said suspending frames and being in the form of downward hooks.

9. The display suspending frame device according to claim 7, wherein said upper front slide rail has a generally L-shaped cross-section, and said lower front slide rail has a generally inverted L-shaped cross-section, said upper connecting portion of each of said suspending frames having two tabs projecting respectively from left and right lateral edges of said support portion of the respective one of said suspending frames and being in the form of downward hooks, said lower connecting portion of each of said suspending frames having two tabs projecting respectively from said left and right lateral edges of said support portion of the respective one of said suspending frames and abutting against a front face of said lower front slide rail.

10. An assembly of a display suspending frame device, a display, and an electronic device, comprising:
    a display having a rear face;
    an electronic device having upper and lower sides; and
    a display suspending frame device including
       a suspending seat including an upright mounting plate, a rear slide rail set disposed forwardly of said mounting plate and connected to said mounting plate, and a front slide rail set disposed forwardly of said rear slide rail set and connected to said rear slide rail set, said rear slide rail set including an upper rear slide rail and a lower rear slide rail which have openings opposite to each other and which are connected respectively to upper and lower edges of said mounting plate, said mounting plate, said upper rear slide rail, and said lower rear slide rail cooperatively defining a receiving space,
       at least one suspending frame mounted to said rear face of said display and mounted slidably on said front slide rail set, and
       at least one slide frame for mounting of said electronic device thereon, said slide frame having upper and lower faces respectively abutting against said upper and lower rear slide rails such that said slide frame is mounted slidably in said receiving space along said upper and lower rear slide rails.

11. The assembly of a display suspending frame device, a display, and an electronic device according to claim 10, wherein said slide frame includes an upper sliding portion with a lower face, and a lower sliding portion with an upper face, said lower face of said upper sliding portion and said upper face of said lower sliding portion being secured respectively to said upper and lower sides of said electronic device, said upper and lower sliding portions respectively abutting against said upper and lower rear slide rails.

12. The assembly of a display suspending frame device, a display, and an electronic device according to claim 10, wherein said slide frame includes an upper sliding portion, a lower sliding portion, and an upright base plate, said base plate having upper and lower edges that are connected respectively to said upper and lower sliding portions, said upper and lower sliding portions respectively abutting against said upper and lower rear slide rails.

13. The assembly of a display suspending frame device, a display, and an electronic device according to claim 12, wherein said base plate is formed with two support portions for securing to said upper and lower sides of said electronic device.

14. The assembly of a display suspending frame device, a display, and an electronic device according to claim 12, wherein said base plate is formed with a plurality of retaining hooks adapted for organizing a cable.

15. The assembly of a display suspending frame device, a display, and an electronic device according to claim 10, wherein said display suspending frame device further includes two side covers, said side covers being mounted respectively to left and right sides of said rear slide rail set of said suspending seat.

16. The assembly of a display suspending frame device, a display, and an electronic device according to claim 10, wherein said front slide rail set has an upper front slide rail connected to said upper rear slide rail, and a lower front slide rail connected to said lower rear slide rail, said display suspending frame device including two of said suspending frames, each of said suspending frames including a support portion for mounting of said rear face of said display thereto, and an upper connecting portion and a lower connecting portion that are spaced apart with one above the other and that project from said support portion in a direction opposite to said display, said upper connecting portion being mounted slidably on said upper front slide rail, said lower connecting portion being mounted slidably on said lower front slide rail.

17. The assembly of a display suspending frame device, a display, and an electronic device according to claim 16, wherein each of said upper and lower front slide rails has a generally L-shaped cross-section, each of said upper and lower connecting portions of each of said suspending frames having two tabs projecting respectively from left and right lateral edges of said support portion of the respective one of said suspending frames and being in the form of downward hooks.

18. The assembly of a display suspending frame device, a display, and an electronic device according to claim 16, wherein said upper front slide rail has a generally L-shaped cross-section, and said lower front slide rail has a generally inverted L-shaped cross-section, said upper connecting portion of each of said suspending frames having two tabs projecting respectively from left and right lateral edges of said support portion of the respective one of said suspending frames and being in the form of downward hooks, said lower connecting portion of each of said suspending frames having two tabs projecting respectively from said left and right lateral edges of said support portion of the respective one of said suspending frames and abutting against a front face of said lower front slide rail.

* * * * *